United States Patent
Oprescu-Surcobe et al.

(10) Patent No.: US 9,473,979 B2
(45) Date of Patent: Oct. 18, 2016

(54) METHOD AND SYSTEM FOR DATA TRANSMISSION

(71) Applicant: MOTOROLA SOLUTIONS, INC., Schaumburg (IL)

(72) Inventors: Valentin Oprescu-Surcobe, Northbrook, IL (US); Baruh Hason, Tel Aviv-Yaffo (IL); Gabi Ofir, Reshon Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 140 days.

(21) Appl. No.: 14/320,224

(22) Filed: Jun. 30, 2014

(65) Prior Publication Data

US 2015/0382233 A1 Dec. 31, 2015

(51) Int. Cl.
| | |
|---|---|
| *H04H 20/71* | (2008.01) |
| *H04W 28/04* | (2009.01) |
| *H04W 28/06* | (2009.01) |
| *H04L 29/06* | (2006.01) |
| *H04L 12/18* | (2006.01) |
| *H04W 4/06* | (2009.01) |

(52) U.S. Cl.
CPC ............ *H04W 28/04* (2013.01); *H04L 12/189* (2013.01); *H04L 12/1863* (2013.01); *H04L 65/608* (2013.01); *H04L 69/04* (2013.01); *H04L 69/22* (2013.01); *H04W 28/06* (2013.01); *H04W 4/06* (2013.01)

(58) Field of Classification Search
CPC .... H04W 28/04; H04W 28/06; H04W 69/04
See application file for complete search history.

(56) References Cited

U.S. PATENT DOCUMENTS

| | | | |
|---|---|---|---|
| 7,355,999 B2 | 4/2008 | Chen et al. | |
| 7,450,547 B2 | 11/2008 | Kim et al. | |
| 7,646,762 B2 | 1/2010 | Cai et al. | |
| 2004/0202167 A1* | 10/2004 | Jonsson | H04L 29/06 370/392 |
| 2005/0094670 A1 | 5/2005 | Kim | |
| 2006/0083270 A1* | 4/2006 | Lee | H04L 12/2854 370/521 |
| 2007/0058679 A1* | 3/2007 | Pelletier | H04W 28/06 370/477 |
| 2009/0311996 A1 | 12/2009 | Furuta | |
| 2011/0019617 A1* | 1/2011 | Ho | H04W 28/06 370/328 |

FOREIGN PATENT DOCUMENTS

| | | |
|---|---|---|
| WO | 0207323 A2 | 1/2002 |
| WO | 2009116673 A1 | 9/2009 |

OTHER PUBLICATIONS

Fitzek et al—"Cooperative IP Header Compression for Parallel Channels in Wireless Meshed Networks"—IEEE—2005—pp. 1331-1335.
Bormann, C. et al., "RObust Header Compression (ROHC): Framework and four profiles: RTP, UDP, ESP, and uncompressed," Network Working Group Request for Comments: 3095, Category: Standards Track, Jul. 2001, pp. 168.
ETSI TS 125 323 V13.0.0 (Jan. 2016); Technical Specification, "Universal Mobile Telecommunications System (UMTS); Jacket Data Convergence Protocol (PDCP) specification (3GPP TS 25.323 version 13.0.0 Release 13)," Section 5.7, pp. 1-45.

(Continued)

*Primary Examiner* — Kan Yuen

(57) ABSTRACT

A method and system for data transmission is provided. Compressed payload packets are transmitted on one or more payload channels. On a header restoration channel, header restoration packets are transmitted for restoring headers of at least some of the compressed payload packets.

15 Claims, 7 Drawing Sheets

(56) References Cited

OTHER PUBLICATIONS

ETSI TS 136 331 V12.6.0 (Jul. 2015; LTE; Evolved Universal Terrestrial Radio Access (E-UTRA); Radio Resource Control (RRC); Protocol Specification (3GPP TS 36.331 version 12.6.0 Release 12); Section 9.1.1.4, pp. 502-502.

Huawei et al., "Support of RoHC for group communication over eMBMS," 3GPP Draft; R2-140263 Support of RoHC for Group Communication over eMBMS, 3rd Generation Partnership Project (3GPP), Mobile Competence Centre; 650, Route des Lucioles; F-06921 Sophia Antipolis Cedex, vol. RAN WG2, No. Prague, Czech Republic; Feb. 9, 2014, Retrieved from the Internet URL: http://www.3gpp.org/ftp/Meetings_3GPP_SYNV/RAN/RAN2/Docs/, retrieved on Sep. 2, 2014, pp. 20140210-20140214.

Sandlund, K. et al., "The RObust Header Compression (ROHC) Framework," Internet Engineering Task Force (IETF) Request for Comments: 5795, Obsoletes: 4995, Category: Standards Track, ISSN: 2070-1721, Mar. 2010, pp. 1-41.

International Search Report and Written Opinion for corresponding International Patent Application No. PCT/US2015/036441, mailed on Nov. 19, 2015.

* cited by examiner

METHOD AND SYSTEM FOR DATA
TRANSMISSION

BACKGROUND OF THE INVENTION

Evolved Multimedia Broadcast Multicast Services (eM-BMS) have been offered over Universal Terrestrial Radio Access Network (UTRAN) and Long-Term Evolution (LTE) wireless communication standards. eMBMS enables broadcast over multiple cells via a single-frequency network (SFN) and are proposed, in the 3rd Generation Partnership Project (3GPP) Group Communication System Enablers (GCSE) for LTE standards, to be used for public safety applications, including mission critical push-to talk, voice and video.

A header compression mechanism is defined in the 3GPP standards for eMBMS over UTRAN, but as of release 12 of 3GPP specifications, is not defined in the 3GPP standards for eMBMS over LTE.

One reason that header compression is not enabled for eMBMS over LTE is that when a receiver enters a Multicast-Broadcast Single-Frequency Network (MBSFN) area after a transmission starts (e.g., concerning a "late joiner"), the receiver will miss the first control packets that carry header compression synchronization information.

Header compression methods typically used for eMBMS over UTRAN, such as Unidirectional Mode Robust Header Compression (ROHC-U described in RFC 3095), do not include full headers in the packets until the header compression is re-synchronized. Therefore, a late joiner cannot rebuild or de-compress the subsequent packets.

Further, if no header compression is used for eMBMS over LTE, uncompressed headers accompany every packet and can be very large relative to the size of the payload. For example, headers typically used for eMBMS, such as Real-time Transport Protocol (RTP) headers, User Datagram Protocol (UDP) headers or Internet Protocol (IP) headers, can use approximately 48 bytes per packet. Therefore, without header compression, eMBMS over LTE can be very wasteful of downlink over-the-air bandwidth.

Accordingly, there is a need for an improved method and system for data transmission.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
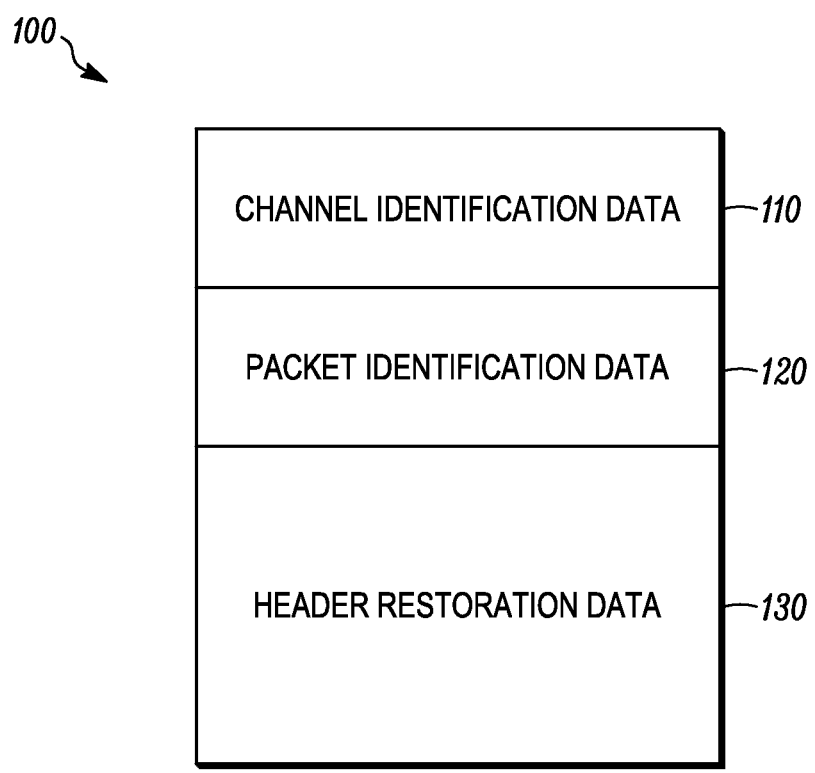
FIG. 1 is a block diagram of a header restoration packet in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to certain embodiments, the present invention resides in a method of transmitting data. The method comprises transmitting compressed payload packets on one or more payload channels and transmitting header restoration packets for restoring headers of at least some of the compressed payload packets on a header restoration channel.

FIG. 1 is a block diagram of a header restoration packet 100 according to some embodiments. The header restoration packet 100 comprises channel identification data 110, packet identification data 120 and header restoration data 130.

The channel identification data 110 identifies a payload channel. In preferred embodiments, the channel identification data 110 includes one or more of the following: a traffic channel number, a bearer identifier, a temporary mobile group identity, a talk-group name, and a talk group identifier.

The packet identification data 120 identifies a compressed payload packet for transmission, for example, over the one or more payload channels. In preferred embodiments, the packet identification data 120 may contain a pointer to an identified compressed payload packet or an identification of the exact time slot, frame, sub-frame, offset or transmission window for that packet. In other preferred embodiments, the packet identification data 120 includes one or more digests computed from all or part of an identified compressed payload packet. For example, the one or more digests include at least one of the following: a checksum; an XOR-sum; a cyclic redundancy check; a hash; an integrity code; and a digital signature. For example, the one or more digests can be matched with a digest of the compressed payload packet to identify the compressed payload packet at a receiver.

In some embodiments, the one or more digests include a digest computed over a first part of the identified compressed payload packet and a digest computed over a second part of the identified compressed payload packet, wherein the first part comprises a smaller amount of data than the second part. As the first part comprises less data, digests for one or more compressed payload packets can be computed faster over the first part at the receiver. The digests then can be compared to the transmitted digest computed over the first part of the identified compressed payload packet in order to eliminate a compressed payload packet or to keep the compressed payload packet under further consideration. When the compressed payload packet is kept under further consideration, a digest can be computed over the second part of the compressed payload packet at the receiver, and in case of a match, the compressed payload packet could be considered identified. In addition, when multiple compressed payload packets have the same first digest at a receiver, the digest computed over the second part can be used to identify the compressed payload packet. A similar procedure can be used with three or more digests.

The header restoration data 130 is for restoring a header of the identified compressed payload packet. In preferred embodiments, the header restoration data 130 comprises all or part of the header of the identified compressed payload packet to enable the header to be restored and may include information such as addresses, port numbers, protocol identifiers, protocol version numbers, lengths of fields, sequence numbers, timestamps, ARQ status variables, flags, counters, CRCs, checksums.

Figure 2:
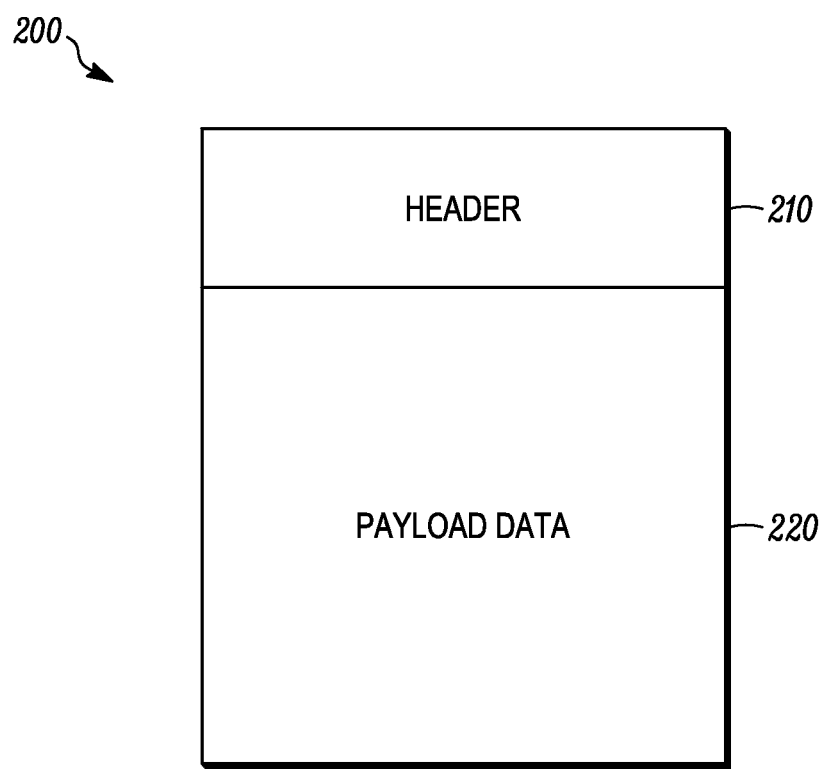
FIG. 2 is a block diagram of a payload packet in accordance with some embodiments.

FIG. 2 is a block diagram of a payload packet 200 according to some embodiments. The payload packet 200 comprises a header 210 and payload data 220. For example, the header can comprise any one or more of an Internet Protocol (IP) header, a User Datagram Protocol (UDP) header, a Real-time Transport Protocol (RTP) header, a Secure Real-time Transport Protocol (SRTP) header, a Transport Layer Security (TLS) protocol header, a Datagram Transport Layer Security (DTLS) protocol header, a Transmission Control Protocol (TCP) header or a Stream Control Transmission Protocol (SCTP) header. In preferred embodiments, the header 210 is compressed to form a compressed payload packet. The header compression may reduce the size of the header of the traffic packets or may eliminate the headers altogether. For example, the compressed payload packet can have a shortened header, an incomplete header, a missing header or no header.

Figure 3:
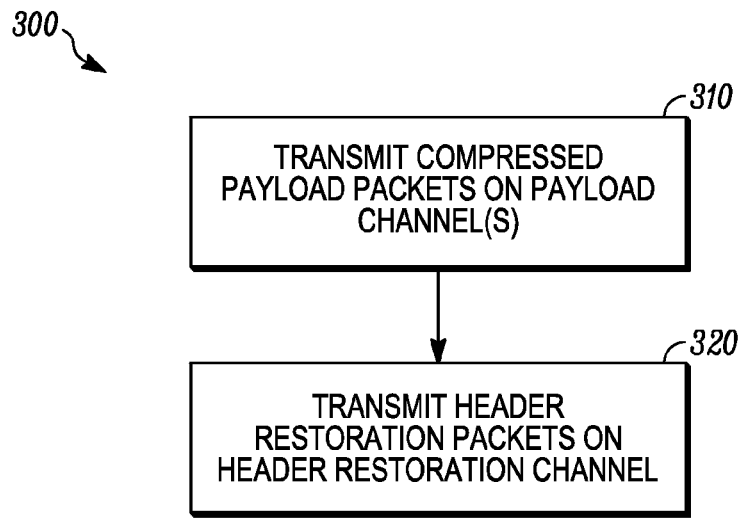
FIG. 3 is a flow diagram of a method for transmitting data in accordance with some embodiments.

FIG. 3 is a flow diagram of a method 300 for transmitting data in accordance with some embodiments. The method 300 comprises the following steps.

At step 310, compressed payload packets are transmitted on one or more payload channels. For example, the compressed payload packets can have headers similar to the header 210 described above.

At step 320, header restoration packets are transmitted on a header restoration channel. The header restoration packets are for restoring headers of at least some of the compressed payload packets. For example, the header restoration packets can be similar to the header restoration packet 100. Alternatively, the packet identification data, the channel identification data and/or the header restoration data can be transmitted in different header restoration packets. In preferred embodiments, the header restoration data is recorded prior to compressing the header, and the packet identification data and the channel identification data are recorded prior to transmitting the compressed payload packet.

Figure 4:
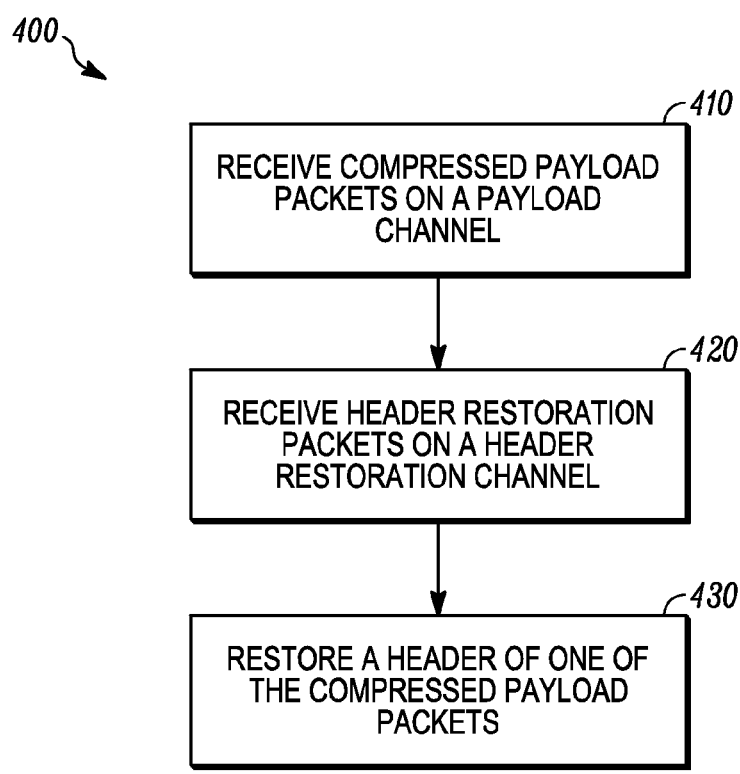
FIG. 4 is a flow diagram of a method for receiving data in accordance with some embodiments.

FIG. 4 is a flow diagram of a method 400 for receiving data in accordance with some embodiments. In some embodiments, the method 400 is used to receive the data transmitted via method 300. The method 400 comprises the following steps.

At step 410, compressed payload packets are received on a payload channel. The compressed payload packets are received with missing or incomplete headers. At step 420, a header restoration packet is received on a header restoration channel. The header restoration packet comprises header restoration data corresponding to one of the compressed payload packets received on the payload channel. For example, the header restoration packet can be similar to the header restoration packet 100. In some embodiments, the header restoration packet does not comprise the packet identification data and/or the channel identification data, and the packet identification data and/or the channel identification data are received in one or more other header restoration packets.

At step 430, a header of the one of the compressed payload packets is restored using the header restoration data. In preferred embodiments, the channel identification data is used to identify the payload channel. One or more digests are then computed for the compressed payload packets received on the payload channel and compared with one or more digests in the packet identification data. Where the one or more digests of a compressed payload packet uniquely and satisfactorily match the one or more digests in the packet identification data, the header of each compressed payload packet is restored using the header restoration data. In preferred embodiments, the headers of other compressed payload packets received on the payload channel can be inferred from the restored header of the compressed payload packet. For example, relevant portions of the headers of different compressed packets sometimes differ only in their sequence numbers.

Figure 5:
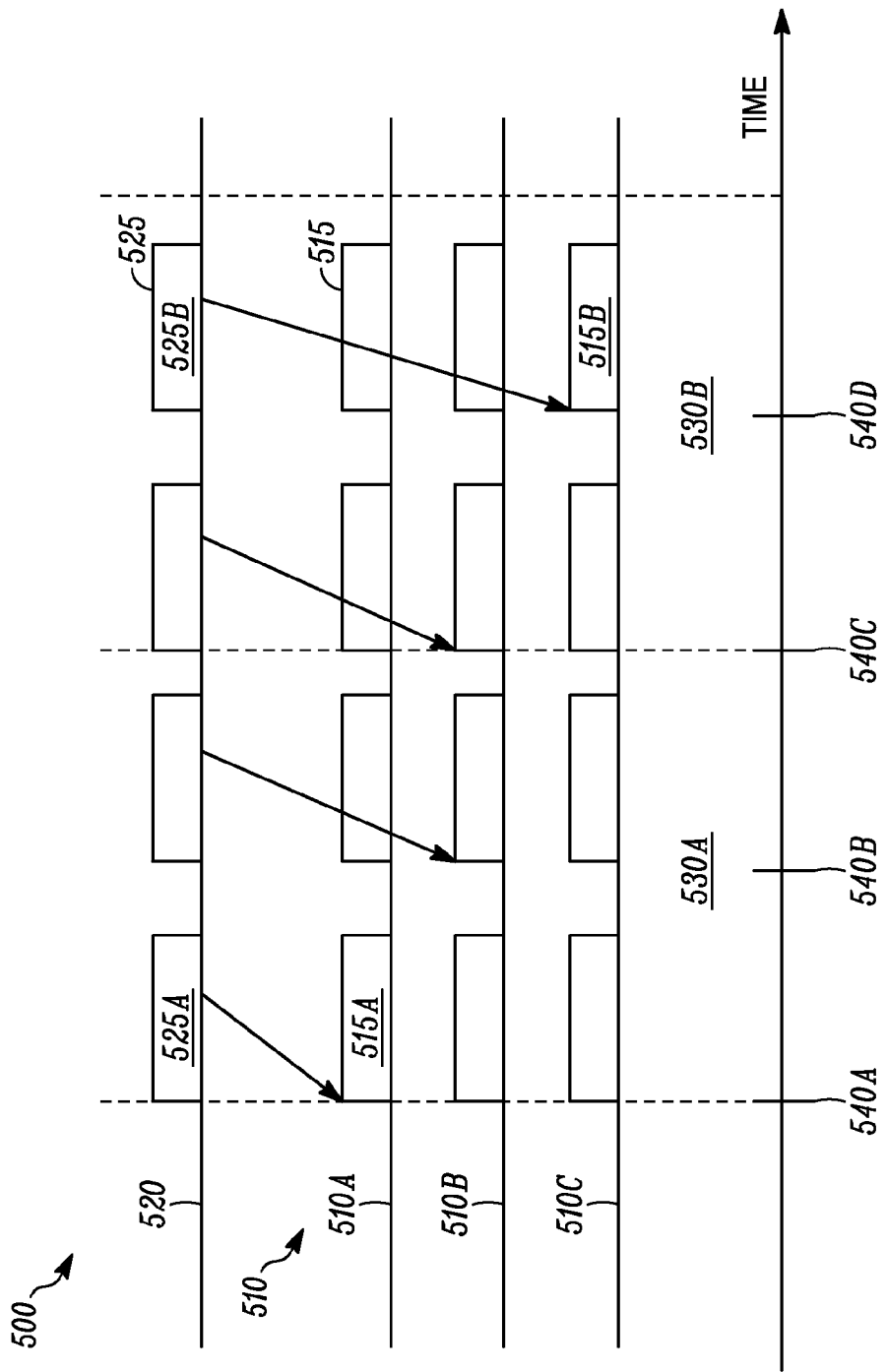
FIG. 5 is a schematic diagram of a data transmission in accordance with some embodiments.

FIG. 5 is a schematic diagram of a data transmission 500 according to some embodiments. Data streams comprising compressed payload packets 515 are transmitted on multiple payload channels 510 (three depicted, that is, a first payload channel 510A, a second payload channel 510B and a third payload channel 510C). Header restoration packets 525 for restoring headers of at least some of the compressed payload packets 515 are transmitted on a header restoration channel 520. The header restoration packets 525 are transmitted in parallel with the compressed payload packets 515.

The header restoration packets 525 are transmitted during definite time windows and are for restoring headers of compressed payload packets 515 that are transmitted within the corresponding time windows. However, in general, the header restoration packets could be transmitted in the same time windows as the corresponding compressed payload packets and/or in preceding or succeeding time windows.

For example, a first header restoration packet 525, depicted as header restoration packet 525A, is for restoring a header of a first compressed payload packet 515, depicted as compressed payload packet 515A, on the first payload channel 510A. Both the first header restoration packet 525A and the first compressed payload packet 515A are transmitted during a first time window 530A. Similarly, a second header restoration packet 525, depicted as header restoration packet 525B, is for restoring a header of a second compressed payload packet 515, depicted as compressed payload packet 515B, on the third payload channel 510C. Both the second header restoration packet 525B and the second compressed payload packet 515B are transmitted during a second time window 530B.

In preferred embodiments, a receiver may begin receiving a data stream on one of the payload channels 510A, 510B or 510C at any time. However, the receiver cannot interpret the data stream until a compressed payload packet 515 and a corresponding header restoration packet 525 are received. For example, the receiver can effectively join or rejoin the data stream on the first payload channel 510A at a time 540A, the data stream on the second payload channel 510B at a time 540B or 540C, and the data stream on the third payload channel 510C at a time 540D.

In some instances a late joiner may need more than one header restoration packet to interpret the payload packets. In these instances the receiver can read more time windows of a payload channel 510A, 510B or 510C and the header restoration channel 520, as necessary.

Figure 6:
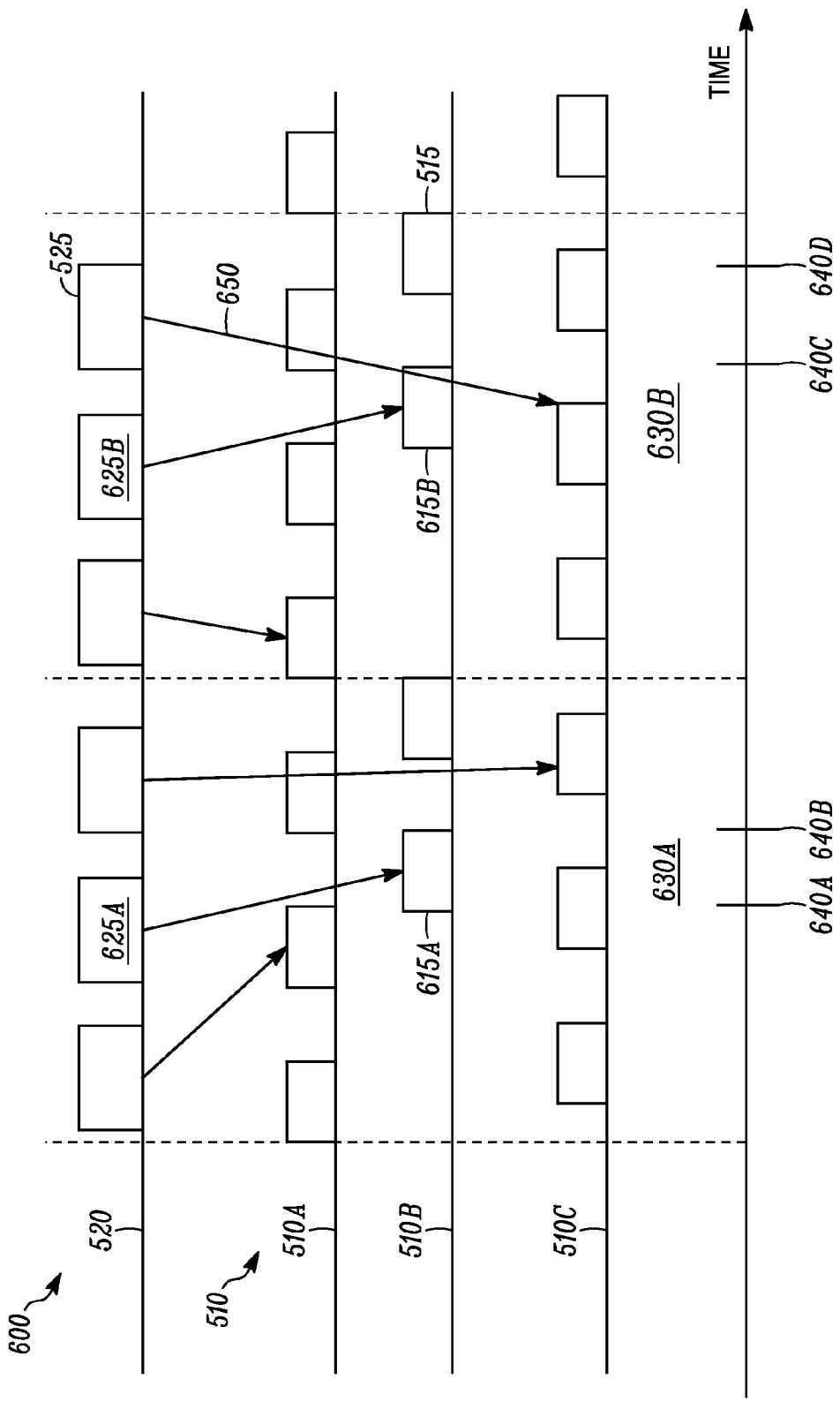
FIG. 6 is a schematic diagram of a data transmission as received at a receiver in accordance with some embodiments.

FIG. 6 is a schematic diagram of a data transmission 600 as received at a receiver according to some embodiments. Data streams comprising compressed payload packets 515 are received on the three payload channels 510A, 510B, 510C. As shown in FIG. 6, the data streams on the three payload channels 510A, 510B, 510C can have different offsets in time.

In each time window, three header restoration packets 525 are received. In the case shown in FIG. 6, it happens that in the same window there are as many header restoration packets as there are compressed payload packets and payload channels, but in general, there are no such restrictions. The three header restoration packets 525 each corresponds to a compressed payload packet on one of the first payload channel 510A, the second payload channel 510B and the third payload channel 510C.

As shown by the arrows 650, a compressed payload packet 515 may be received before, during or after the transmission of the corresponding header restoration packet 525. In general, a data stream can be interpreted only after at least one compressed payload packet 515 and the corresponding header restoration packet(s) 525 have been received.

For example, if a receiver begins receiving the data transmission 600 at the start of a first time window 630A, the data stream on the first payload channel 510A can be interpreted after time 640A. Similarly, if a receiver begins receiving the data transmission 600 at the start of a second time window 630B, the data stream on the third payload channel 510C can be interpreted after time 640D.

The data stream on the second payload channel 510B is missing a first compressed payload packet in each of the first time window 630A and the second time window 630B. However, the data stream on the second payload channel 510B can be interpreted after time 640B in the first time window 630A by restoring a header of a first compressed payload packet 615A using a first header restoration packet 625A. After a compressed payload packet 515 on the second payload channel 510B is dropped or was not transmitted as a first packet in the second time window 630B, the receiver can re-join and interpret the data stream on the second payload channel 510B after time 640C by restoring a header of a second compressed payload packet 615B using a second header restoration packet 625B.

Figure 7:
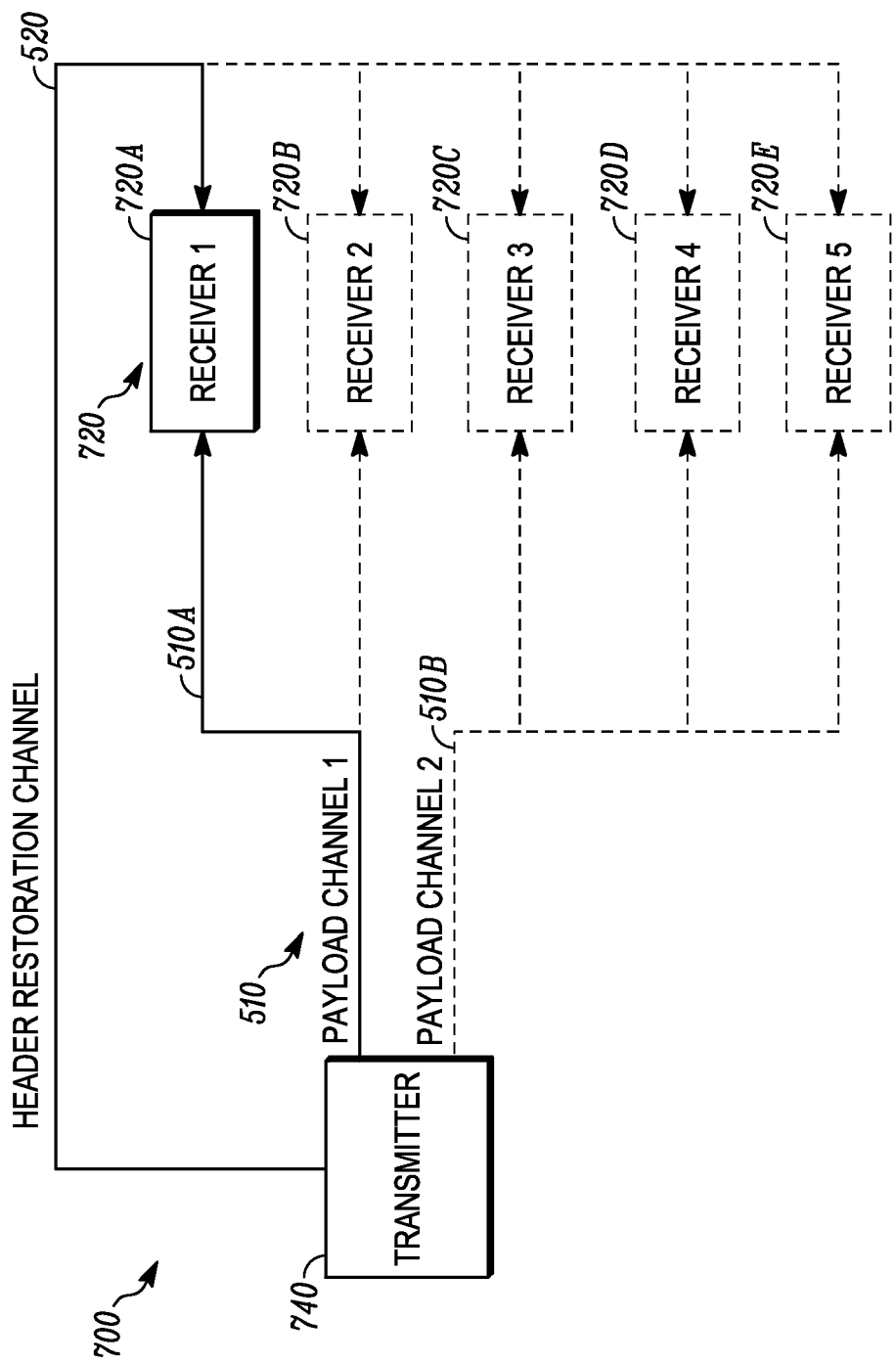
FIG. 7 is a block diagram of a system for data transmission in accordance with some embodiments.

FIG. 7 is a block diagram of a system 700 for data transmission according to some embodiments. The system comprises a transmitter 740 for transmitting data and one or more receivers 720 for receiving the data. The data is transmitted between the transmitter 740 and the one or more receivers 720 on a header restoration channel 520 and one or more payload channels 510. In some embodiments, there can also be multiple header restoration channels. In some embodiments, the transmitter 740 transmits a data transmission, such as the data transmission 500 or the data transmission 600 referred to above. In preferred embodiments, the header restoration channel 520 and the payload channels 510 are logical channels that can be mapped to the same or different physical channel(s).

As shown in FIG. 7, a first data stream of compressed payload packets can be transmitted on a first payload channel 510A to a first receiver 720A and a second receiver 720B. A second data stream of compressed payload packets can be transmitted on a second payload channel 510B to a third receiver 720C, a fourth receiver 720D and a fifth receiver 720E. Header restoration packets for restoring headers of at least some of the compressed payload packets in the first data stream and the second data stream can be transmitted on the header restoration channel 520 to the first receiver 720A, the second receiver 720B, the third receiver 720C, the fourth receiver 720D and the fifth receiver 720E.

Figure 8:
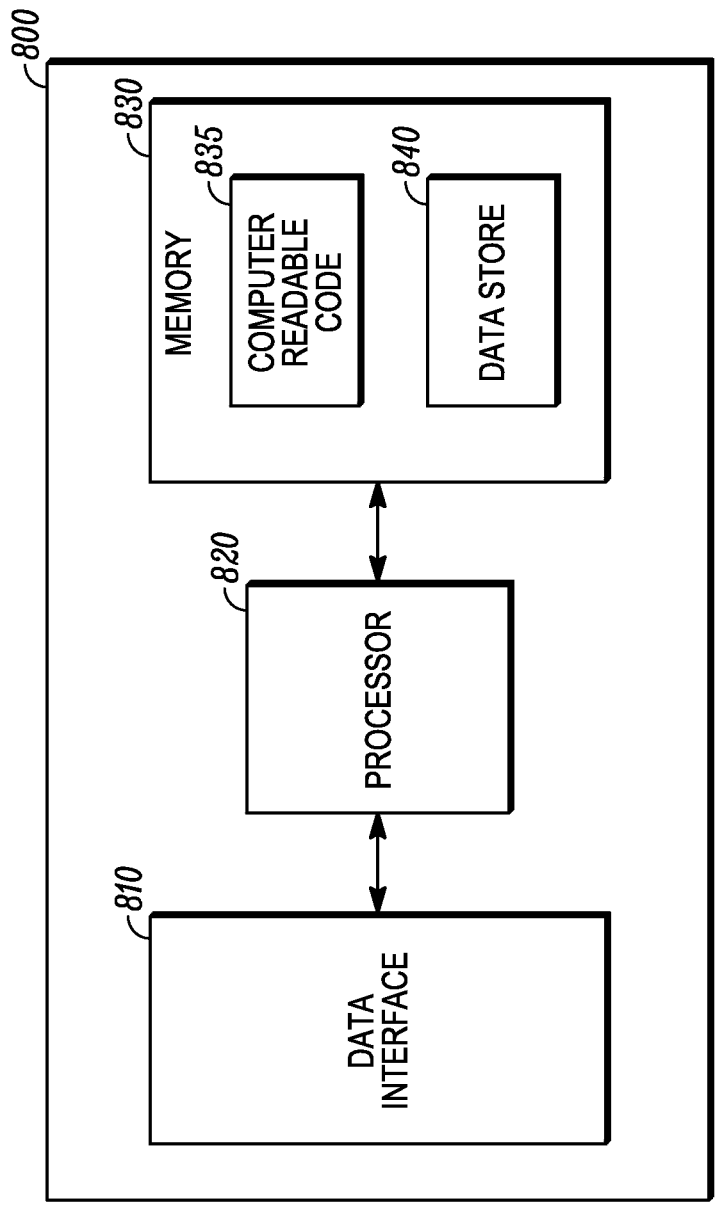
FIG. 8 is a block diagram of a device in accordance with some embodiments.

FIG. 8 is a schematic diagram of a device 800 according to some embodiments. The device 800 can be the transmitter 740 or one or more of the one or more receivers 720 referred to above.

The device 800 comprises a processor 820 and a memory 830 coupled to the processor 820. The memory 830 comprises instruction code 835 for implementing various aspects of the present invention including various methods and functions of the embodiments described herein. The processor 820 processes the computer instruction code 835 stored in the memory 830 and executes corresponding instructions.

The memory 830 includes a data store 840 to store data such as the data used in the embodiments. As will be understood by a person skilled in the art, a single memory, such as the memory 830, can be used to store both dynamic and static data. The structure of the memory 830 is well known to those skilled in the art and can include a basic input/output system (BIOS) stored in a read only memory (ROM) and one or more program modules such as operating systems, application programs and program data stored in random access memory (RAM).

One or more interfaces 810 are coupled to the processor 820. The one or more interfaces 810 include, for example, an antenna and transmitter and/or receiver to transmit and/or receive a radio communication, a network card or modem to transmit and/or receive a wired communication, and/or one or more other communications devices.

Where the device 800 is a transmitter, the memory 830 can comprise instruction code 835 for executing the following: transmitting, on one or more payload channels to the one or more receivers, compressed payload packets; and transmitting, on one or more header restoration channels to the one or more receivers, header restoration packets for restoring headers of at least some of the compressed payload packets.

In some embodiments, the memory 830 of the transmitter 800 comprises instruction code 835 for performing one or more of the steps of method 300. In some embodiments, the memory 830 of the transmitter 800 also comprises instruction code for generating one or more header restoration packets and/or compressed payload packets such as the header restoration packets and/or the compressed payload packets referred to above. In some embodiments, the memory 830 of the transmitter 800 also comprises instruction code for generating the one or more digests described herein.

In some embodiments, the memory 830 of the transmitter 800 also comprises instruction code for performing other aspects of embodiments of the invention at the transmitter. For example, the memory 830 of the transmitter 800 comprises instruction code 835 for performing one or more of the following: recording all or part of the information contained in the header of a payload packet in a header restoration packet; compressing the payload packet to form a compressed payload packet; computing one or more digests from all or part of the compressed payload packet and/or including the one or more digests in the packet identification data of the header restoration packet; and instructing a scheduler to transmit the compressed payload packet on a compressed payload channel and the header restoration packet on a header restoration channel during definite time windows.

In some embodiments, the transmitter 800 comprises instruction code for detecting when multiple compressed payload packets within the same time window will have the same digests and discarding the header restoration packet which corresponds to those packets.

By including one or more digests computed from all or part of the compressed payload packet in the packet identification data, the exact position of the compressed payload packet on the payload channel need not be known.

For example, in some instances, the radio frequency sub-frame and offset may not be known when the packet identification data is computed. For example, the packet identification data may be computed at a Broadcast Multicast Service Centre (BM-SC) prior to encapsulation in a synchronization protocol packet, and the position of the packet on the channel may be determined by a MBMS Coordination Entity (MCE) at an Evolved Node B (eNB).

In some embodiments, the data store 840 of the transmitter 800 can include data, such as the payload data sent in the compressed payload packets.

Where the device 800 is a receiver, the memory 830 can comprise instruction code 835 for executing the following: receiving, on a payload channel, compressed payload packets; receiving, on a header restoration channel, a header restoration packet comprising header restoration data corresponding to one of the compressed payload packets received on the payload channel; and restoring a header of the one of the compressed payload packets using the header restoration data. In some embodiments, the memory 830 of the receiver 800 comprises instruction code 835 for performing one or more of the steps of method 400.

In some embodiments, the memory 830 of the receiver 800 also comprises instruction code for performing other aspects of embodiments of the invention at the receiver. For example, the memory 830 of the receiver 800 comprises instruction code 835 for performing one or more of the following: computing one or more digests of one or more of the compressed payload packets, for example in a time window; matching one or more digests in the packet identification data of a header restoration packet to the one or more computed digests of one or more of the one or more compressed payload packets; applying the header restoration data of the header restoration packet to one of the one or more payload packets where the digests match; and inferring the headers of other compressed payload packets received on the payload channel from the header of the one of the compressed payload packets.

In preferred embodiments, digests are computed for all compressed traffic packets received in a time window. There can be a very small, yet non-zero, probability that a plurality of different compressed payload packets in the same time window will yield the same digest and therefore it may not be clear to which packet the packet identification data refers. In some embodiments, a disambiguation rule can be implemented to overcome this problem. For example, the packet identification data can be assumed to identify the first matched compressed payload packet in the time window.

In embodiments where the packet identification data, the channel identification data and/or the header restoration data are transmitted in different packets on the header restoration channel, and definite time windows are used to transmit and receive the data, there is a small, yet non-zero, probability that the packet identification data, channel identification data and/or the header restoration data may end up in a different time window.

This can be resolved, for example, by sending no packets near the edges of the window or by ignoring packet identification data that points to a different time window.

Embodiments of the present invention can be used, for example, in unicast, multicast and/or broadcast communications. For example, embodiments of the present invention can be used for facilitating header compression for eMBMS over LTE, such as by transmitting compressed payload packets on one or more point-to-multipoint (p-t-m) downlink channels and transmitting header restoration packets on a separate p-t-m downlink channel.

In one example, each payload channel may correspond to a virtual channel and map to a p-t-m bearer sent on an eMBMS point-to-multipoint Traffic Channel (MTCH). For example, it is possible to map multiple bearers to a single MTCH. The header restoration channel may be another MTCH that corresponds to a specific Application Channel. In some embodiments, multiple header restoration channels can be used.

In broadcast and multicast, embodiments of the present invention can also be applied directly to other systems such as MBMS/UTRAN, BCMCS/cdma2000, BCMCS/eVDO, UMB and DVB.

Embodiments of the present invention can reduce data loss incurred by a late joiner, for example, because the late joiner does not need to wait for re-synchronization of the header compression method on the payload channel. Embodiments of the present invention can enable late joiners to join a channel after the start of transmission, for example by moving into a cell or reception area, switching to the channel transmitted, powering up a receiver, or continuing reception after losing packets or loss of a count of the packets.

Embodiments of the present invention can also provide header compression with a constant bit rate on a payload channel, for example an MBMS channel.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of transmitting data, the method comprising:
   transmitting, on one or more payload channels, compressed payload packets; and
   transmitting, on a header restoration channel, header restoration packets for restoring headers of at least some of the compressed payload packets, wherein the header restoration packets comprise:
   packet identification data identifying a compressed payload packet, wherein the packet identification data includes one or more digests computed from all or part of the identified compressed payload packet, and wherein the one or more digests include a digest computed over a first part of the identified compressed payload packet and a digest computed over a second part of the identified compressed payload packet, wherein the first part comprises a smaller amount of data than the second part; and
   header restoration data for restoring a header of the identified compressed payload packet.

2. The method of claim 1 wherein one or more of the compressed payload packets are transmitted with no header, a shortened header, a missing header or an incomplete header.

3. The method of claim 1 wherein the header restoration packets comprise channel identification data identifying one of the one or more payload channels.

4. The method of claim 3 wherein the channel identification data includes a traffic channel number, a bearer identifier, a temporary mobile group identity, or a talk-group name or identifier.

5. The method of claim 1 wherein the header restoration data comprises all or part of the header of the identified compressed payload packet.

6. The method of claim 1 wherein each of the one or more digests includes at least one of the following: a checksum; an XOR-sum; a cyclic redundancy check; a hash; an integrity code; and a digital signature.

7. The method of claim 1 wherein the header restoration packets are transmitted during definite time windows and are for restoring headers of compressed payload packets transmitted within corresponding time windows.

8. The method of claim 1 wherein the header restoration packets are transmitted in parallel with the compressed payload packets.

9. The method of claim 1 wherein the headers can comprise any one or more of an Internet Protocol header, a User Datagram Protocol header, a Real-time Transport Protocol header, a Secure Real-time Transport Protocol header, a Transport Layer Security protocol header, a Datagram Transport Layer Security protocol header, a Transmission Control Protocol header or a Stream Control Transmission Protocol header.

10. A method of receiving data, the method comprising:
    receiving, on a payload channel, compressed payload packets;
    receiving, on a header restoration channel, a header restoration packet comprising header restoration data corresponding to one of the compressed payload packets received on the payload channel, wherein the header restoration packet comprises packet identification data identifying the one of the compressed payload packets, wherein the packet identification data includes one or more digests computed from all or part of the identified compressed payload packet, and wherein the one or more digests include a digest computed over a first part of the identified compressed payload packet and a digest computed over a second part of the identified compressed payload packet, wherein the first part comprises a smaller amount of data than the second part; and restoring a header of the one of the compressed payload packets using the header restoration data.

11. The method of claim 10 wherein the header restoration packet comprises channel identification data identifying the payload channel.

12. The method of claim 10 further comprising:
calculating a second digest for one or more of the compressed payload packets; and
comparing the second digest to the one or more digests included in the packet identification data to identify the one of the payload packets to be restored.

13. The method of claim 10 further comprising inferring from the header of the one of the compressed payload packets, the headers of other compressed payload packets received on the payload channel.

14. An apparatus for data transmission, the apparatus comprising:
a transmitter comprising:
a processor; and
a memory coupled to the processor, the memory comprising instruction code for:
transmitting, on one or more payload channels, compressed payload packets, wherein the compressed payload packets are transmitted with compressed headers; and
transmitting, on a header restoration channel, header restoration packets for restoring headers of at least some of the compressed payload packets, wherein the header restoration packets comprise:

packet identification data identifying a compressed payload packet, wherein the packet identification data includes one or more digests computed from all or part of the identified compressed payload packet, and wherein the one or more digests include a digest computed over a first part of the identified compressed payload packet and a digest computed over a second part of the identified compressed payload packet, wherein the first part comprises a smaller amount of data than the second part; and header restoration data for restoring a header of the identified compressed payload packet.

15. The apparatus of claim 14 wherein the header restoration packets comprise channel identification data identifying one of the one or more payload channels.

* * * * *